(12) United States Patent
Lee et al.

(10) Patent No.: US 11,687,090 B2
(45) Date of Patent: Jun. 27, 2023

(54) APPARATUS AND METHOD OF IDENTIFYING SHORT CUT-IN TARGET

(71) Applicants: Hyundai Motor Company, Seoul (KR); Kia Motors Corporation, Seoul (KR)

(72) Inventors: Kyoung Jun Lee, Seoul (KR); Seung Joon Lee, Seoul (KR); Dong Gu Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 805 days.

(21) Appl. No.: 16/791,007

(22) Filed: Feb. 14, 2020

(65) Prior Publication Data

US 2021/0139030 A1 May 13, 2021

(30) Foreign Application Priority Data

Nov. 12, 2019 (KR) .................. 10-2019-0143943

(51) Int. Cl.
| | |
|---|---|
| G05D 1/02 | (2020.01) |
| B60W 30/16 | (2020.01) |
| G06V 20/58 | (2022.01) |
| G06V 20/56 | (2022.01) |
| G06F 18/22 | (2023.01) |
| G06F 18/25 | (2023.01) |

(52) U.S. Cl.
CPC ........... *G05D 1/0274* (2013.01); *B60W 30/16* (2013.01); *G05D 1/0212* (2013.01); *G06F 18/22* (2023.01); *G06F 18/25* (2023.01); *G06V 20/58* (2022.01); *G06V 20/588* (2022.01); *G05D 2201/0213* (2013.01)

(58) Field of Classification Search
None
See application file for complete search history.

(56) References Cited

U.S. PATENT DOCUMENTS

| | | | | |
|---|---|---|---|---|
| 2016/0291145 | A1* | 10/2016 | Zeng | G01S 13/867 |
| 2018/0009436 | A1* | 1/2018 | Gupta | B60W 50/14 |
| 2018/0164816 | A1* | 6/2018 | Hashimoto | G08G 1/162 |
| 2019/0315352 | A1* | 10/2019 | Gutmann | G08G 1/166 |
| 2021/0103285 | A1* | 4/2021 | Philbin | G05D 1/0088 |
| 2021/0181758 | A1* | 6/2021 | Das | G01S 13/89 |

* cited by examiner

*Primary Examiner* — Adam D Tissot
*Assistant Examiner* — Garrett F Evans
(74) *Attorney, Agent, or Firm* — Slater Matsil, LLP

(57) ABSTRACT

Disclosed are a short cut-in target identification apparatus and an identification method thereof. The short cut-in target identification apparatus includes an occupancy distance map (ODM) information calculator configured to calculate ODM information based on subject vehicle and surrounding object information, a track information calculator configured to calculate track information based on the subject vehicle and surrounding object information, and a short cut-in target selector configured to select a short cut-in target based on the ODM information and the track information.

20 Claims, 12 Drawing Sheets

APPARATUS AND METHOD OF IDENTIFYING SHORT CUT-IN TARGET

CROSS-REFERENCE TO RELATED APPLICATIONS

This application claims priority to Korean Patent Application No. 10-2019-0143943, filed on Nov. 12, 2019, which application is hereby incorporated herein by reference.

TECHNICAL FIELD

The present disclosure relates to and apparatus and method of identifying a short cut-in target.

BACKGROUND

In general, vehicles have been developed in the direction of intelligent vehicles for providing enhanced safety and convenience using recently developed information communication technologies as well as enhancing fuel efficiency and performance as transport devices.

However, since an intelligent vehicle includes additional functions such as an entertainment system, an air filter, and convenience devices, a driver needs to manipulate other additional manipulation devices as well as a manipulation device for driving, and thus there is increasing risk of an accident due to the carelessness of a driver.

Accordingly, recently, research has been conducted to realize a safety device for preventing or avoiding a vehicle crash in various ways.

Vehicle crash avoidance apparatuses include an adaptive cruise control system, a forward vehicle crash warning system, a lane departure warning system, and so on and these vehicle crash avoidance apparatuses are mainly used in the case of high-speed travel to prevent serious accidents and most of the technologies used by such vehicle crash avoidance apparatuses relate to detection of obstacles at a long distance in the case of high-speed travel.

However, with regard to most actual traffic accidents, 70% or greater of the accidents are mainly caused at a low speed equal to or less than about 30 km/h due to congested traffic in cities and, thus, a conventional crash avoidance apparatus is not suitable for accurately recognizing a counterpart vehicle cutting in at a short distance during low-speed driving and preventing crash.

For example, when a counterpart vehicle cuts in at a short distance during low-speed driving, a subject vehicle is not capable of accurately recognizing corner radar information due to noise included in the corner radar information, or is not capable of accurately recognizing the situation of a counterpart vehicle that cuts in at a short distance during low-speed driving due to coasting and, thus, misjudges the situation and crashes into a counterpart vehicle.

A current smart cruise control (SCC) system has a problem in that the system is not capable of recognizing a leading vehicle that deviates from a recognition region of a front radar and a front camera.

In a congested road, a counterpart vehicle frequently cuts in at a short distance, and when a leading vehicle deviates from a recognition region in the corresponding situation, there is also a problem in that the leading vehicle is not capable of correspondingly slowing down, thus causing a crash risk.

Accordingly, in the future, there is a need for an apparatus for identifying a short cut-in target for enhancing reliability and safety by accurately determining various situations of a counterpart vehicle that cuts in at a short distance during low-speed driving.

SUMMARY

The present disclosure relates to a short cut-in target identification apparatus. Particular embodiments relate to a short cut-in target identification apparatus and an identification method thereof for determining a short cut-in target using occupancy distance map (ODM) information and track information.

Embodiments of the present disclosure provide a short cut-in target identification apparatus and an identification method thereof for matching ODM information corrected based on a driving state of a subject vehicle and a plurality of candidate tracks selected based on track information to each other to identify a short cut-in vehicle, thereby enhancing reliability and safety.

Technical problems solved by the embodiments are not limited to the above technical problems and other technical problems which are not described herein will become apparent to those skilled in the art from the following description.

According to an embodiment of the present disclosure, a short cut-in target identification apparatus includes an occupancy distance map (ODM) information calculator configured to calculate ODM information based on subject vehicle and surrounding object information. A track information calculator is configured to calculate track information based on the subject vehicle and surrounding object information. A short cut-in target selector is configured to select a short cut-in target based on the ODM information and the track information. The short cut-in target selector determines whether the subject vehicle satisfies a short cut-in target identification entry condition, verifies validity of the ODM information and removes invalid ODM information when the subject vehicle satisfies the short cut-in target identification entry condition, corrects the ODM information based on a driving state of the subject vehicle, selects an ODM track candidate group including a plurality of candidate tracks based on the track information, matches each candidate track and an ODM object corresponding thereto to a grid map of the ODM information to identify short cut-in of the candidate track, determines a short cut-in target from short cut-in candidate tracks, and outputs the determined short cut-in target information.

According to another embodiment of the present disclosure, a method of identifying a short cut-in target of a short cut-in target identification apparatus including a short cut-in target selector for selecting a short cut-in target based on ODM information and track information includes determining whether a subject vehicle satisfies a short cut-in target identification entry condition, by the short cut-in target selector, verifying validity of the ODM information and removing invalid ODM information when the subject vehicle satisfies the short cut-in target identification entry condition, by the short cut-in target selector, correcting the ODM information based on a driving state of the subject vehicle, by the short cut-in target selector, selecting an ODM track candidate group including a plurality of candidate tracks based on the track information, by the short cut-in target selector, matching each candidate track and an ODM object corresponding thereto to a grid map of the ODM information to identify short cut-in of the candidate track, by the short cut-in target selector, determining a short cut-in target from short cut-in candidate tracks, by the short cut-in target selector, and outputting the determined short cut-in target information, by the short cut-in target selector.

According to an embodiment of the present disclosure, a computer-readable recording medium has recorded thereon a program for executing the method.

According to an embodiment of the present disclosure, a vehicle includes a sensing apparatus configured to sense a subject vehicle and a surrounding object, and a short cut-in target identification apparatus configured to identify a short cut-in vehicle based on subject vehicle and surrounding object information received from the sensing apparatus, wherein the short cut-in target identification apparatus includes an occupancy distance map (ODM) information calculator configured to calculate ODM information based on the subject vehicle and surrounding object information, a track information calculator configured to calculate track information based on the subject vehicle and surrounding object information, and a short cut-in target selector configured to determine whether the subject vehicle satisfies a short cut-in target identification entry condition, to verify the validity of the ODM information and to remove invalid ODM information when the subject vehicle satisfies the short cut-in target identification entry condition, to correct the ODM information based on a driving state of the subject vehicle, to select an ODM track candidate group including a plurality of candidate tracks based on the track information, to match each candidate track and an ODM object corresponding thereto to a grid map of the ODM information to identify short cut-in of the candidate track, to identify a short cut-in target from short cut-in candidate tracks, and to output the identified short cut-in target information.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF ILLUSTRATIVE EMBODIMENTS

Figure 1:
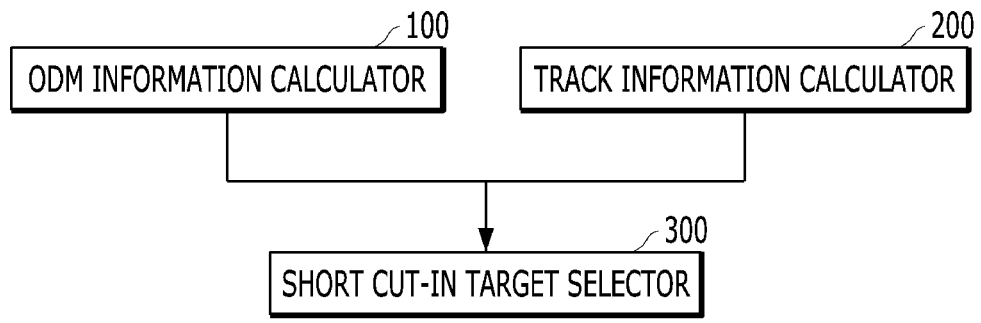
FIG. 1 is a block diagram for explanation of a short cut-in target identification apparatus according to the present disclosure.

Exemplary embodiments of the present disclosure are described in detail so as for those of ordinary skill in the art to easily implement the present disclosure with reference to the accompanying drawings. However, the present disclosure may be implemented in various different forms and is not limited to these embodiments. To clearly describe the present disclosure, a part without concerning to the description is omitted in the drawings, and like reference numerals in the specification denote like elements.

Throughout the specification, one of ordinary skill would understand terms "include", "comprise", and "have" to be interpreted by default as inclusive or open rather than exclusive or closed unless expressly defined to the contrary. Further, terms such as "unit", "module", etc. disclosed in the specification mean units for processing at least one function or operation, which may be implemented by hardware, software, or a combination thereof.

Throughout the specification, when a certain part "includes" a certain component, this indicates that the part may further include another component instead of excluding another component unless there is no different disclosure. The same reference numbers will be used throughout the drawings to refer to the same parts.

Hereinafter, an apparatus and method for identifying a short cut-in vehicle target, applicable to embodiments of the present disclosure, are described in detail with reference to FIGS. 1 to 15.

FIG. 1 is a block diagram for explanation of a short cut-in target identification apparatus according to the present disclosure.

As shown in FIG. 1, the short cut-in target identification apparatus according to the present disclosure may include an occupancy distance map (ODM) information calculator 100, a track information calculator 200, and a short cut-in target selector 300.

Here, the ODM information calculator 100 may calculate ODM information based on information on the subject vehicle and on surrounding objects.

That is, the ODM information calculator 100 may be an element for calculating the ODM information and may calculate information (a position, a relative speed, or the like) of an object present in a lattice-type space that is a concept of a free space.

The ODM information may include a grid map corresponding to an ODM object and a surrounding object detection region including a plurality of detection points.

Here, the detection point may use only valid detection information among detection information transmitted from a radar.

For example, the detection information used to determine ODM may include distance information, speed information, angle information, and signal intensity information.

The ODM object may be a cluster, and may be a detection group determined to be an object or a vehicle.

The ODM object may track an object that moves or stops using the detection information output into the ODM region.

Then, the grid map may divide front longitudinal and lateral region into 6 pails but is not limited thereto.

For example, the grid map may include two internal regions IR, two first external regions ER 1, and two second external regions ER 2.

A width of one internal region may be calculated using IR=vehicle width/2+α (IR (Internal Region) being a width of an internal region, and a being a margin value in consideration of a side mirror).

Here, the vehicle width may be changed according to the specifications of the subject vehicle, and a may be about 0.5 m to about 1.5 m, but the present invention is not limited thereto.

The width of one first external region may be calculated using ER1=vehicle width/2−IR (ER1 (External Region1) being a width of the first external region, and IR being a width of an internal region).

Here, the vehicle width may be about 3 m to about 4 m, but the present invention is not limited thereto.

The width of one second external region may be about 0.2 m to about 0.8 m.

The length of the internal region may be the same as the length of each of the first and second external regions.

For example, the length of each of the internal region, the first external region, and the second external region may be about 15 m to about 25 m in a forward direction from a front surface of the subject vehicle.

Then, the track information calculator 200 may calculate track information based on the subject vehicle and surrounding object information.

Here, the track information calculator 200 may calculate information that is generally output from a front recognition sensor such as a radar, a LIDAR, or a camera sensor, and information (a position, a relative speed, or the like) of an object identified as having an independent form (vehicle/pedestrian/structure, or the like).

Then, the short cut-in target selector 300 may identify a short cut-in vehicle based on the ODM information and the track information.

That is, the short cut-in target selector 300 may determine whether a subject vehicle satisfies a short cut-in target identification entry condition, may verify the validity of ODM information and may remove invalid ODM information when the subject vehicle satisfies the short cut-in target identification entry condition, may correct the ODM information based on a driving state of the subject vehicle, may select an ODM track candidate group including a plurality of candidate tracks based on the track information, may match each candidate track and an ODM object corresponding thereto to a grid map of the ODM information to identify short cut-in of the candidate track, may determine a short cut-in target from short cut-in candidate tracks, and may output the determined short cut-in target information.

Here, when determining whether the subject object satisfies the short cut-in target identification entry condition, the short cut-in target selector 300 may receive driving state information of the subject vehicle, including offset information, heading information, and slalom information of the subject vehicle, and may determine whether the driving state of the subject vehicle satisfies the short cut-in target identification entry condition based on the driving state information of the subject vehicle.

When verifying the validity of the ODM information, the short cut-in target selector 300 may determine the attributes of the ODM information to identify ODM information from a stationary obstacle, and may determine that the identified ODM information is not valid.

When verifying the validity of the ODM information, the short cut-in target selector 300 may identify ODM information measured by a leading ego-vehicle lane target from ODM information, and may determine that the identified ODM information is not valid.

Then, when correcting the ODM information, the short cut-in target selector 300 may correct the ODM information based on at least one of the offset information or heading information of the subject vehicle.

When correcting the ODM information, the short cut-in target selector 300 may rearrange the ODM information including the grid map based on a coordinate system with respect to a driving lane.

Then, when correcting the ODM track candidate group, the short cut-in target selector 300 may select tracks of left and right lanes based on a subject vehicle lane among a plurality of sensor fusion tracks as the ODM track candidate group based on the track information.

Then, when determining short cut-in of the candidate track, the short cut-in target selector 300 may add a margin value to the length and width of each candidate track to set a candidate track matching region and may identify short cut-in of the candidate track based on the set candidate track matching region.

Here, when setting the candidate track matching region, the short cut-in target selector 300 may sum the length and length margin of the candidate track to set a longitudinal region of the candidate track matching region, and may sum the width and width margin of the candidate track to set a lateral region of the candidate track matching region.

When determining short cut-in of the candidate track, the short cut-in target selector 300 may add a width margin value for heading to the width of each candidate track to set a candidate track matching region and may identify short cut-in of the candidate track based on the set candidate track matching region.

Here, when setting the candidate track matching region, the short cut-in target selector 300 may multiply the length of the candidate track and a heading angle of the candidate track to calculate a width margin value for heading, and may sum the calculated width margin value for heading and the width of the candidate track to set a lateral region of the candidate track matching region.

Then, when determining short cut-in of the candidate track, the short cut-in target selector 300 may match each candidate track and an ODM object corresponding thereto to the grid map and may determine a short cut-in state of each candidate track based on matching.

Here, when determining the short cut-in state of each candidate track, the short cut-in target selector 300 may determine the short cut-in state of the candidate track to be any one of an undetected state, a new state, an update state, a track coasting state, an ODM coasting state, and a time coasting state, based on the matching.

Then, when determining the short cut-in target, the short cut-in target selector 300 may determine the closest candidate track to the subject vehicle as the short cut-in target among candidate tracks identified as short cut-in tracks in left and right lanes based on the subject vehicle lane.

For example, when determining the short cut-in target, the short cut-in target selector 300 may select a first candidate track that is closest to the subject vehicle among candidate tracks identified as short cut-in tracks in a left lane based on the subject vehicle lane, may select a second candidate track that is closest to the subject vehicle among candidate tracks identified as short cut-in tracks in a right lane based on the subject vehicle lane, and may determine two candidate tracks including the first and second candidate tracks as the short cut-in target.

When outputting the determined short cut-in target information, the short cut-in target selector 300 may calculate the position information and the relative speed information based on a measurement point of the short cut-in target, and may output the short cut-in target information including the calculated position and relative speed information.

As such, according to the present disclosure, the ODM information corrected based on the driving state of the subject vehicle and the plurality of candidate tracks selected based on the track information may be matched to each other to identify the short cut-in target, thereby enhancing reliability and safety.

Thus, according to the present disclosure, various situations of a counterpart vehicle that cuts in at a low speed from a short distance may be accurately determined, thereby enhancing reliability and safety.

Figure 2:
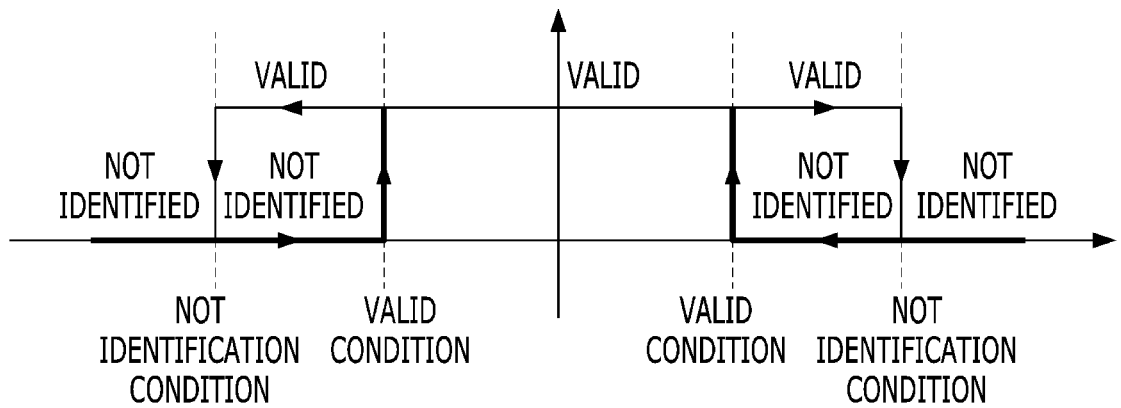
FIG. 2 is a diagram for explaining a procedure of identifying a short cut-in target identification entry condition.

FIG. 2 is a diagram for explaining a procedure of identifying a short cut-in target identification entry condition.

As shown in FIG. 2, first, a short cut-in target selector according to the present disclosure may determine whether a subject vehicle satisfies a short cut-in target identification entry condition in order to identify a short cut-in vehicle.

That is, the short cut-in target selector may perform a processing procedure of identifying the short cut-in vehicle when the driving state of the subject vehicle satisfies the short cut-in target identification entry condition.

Thus, when determining whether the subject satisfies the short cut-in target identification entry condition, the short cut-in target selector may receive driving state information of the subject vehicle, including offset information, heading information, and slalom information of the subject vehicle, and may determine whether the driving state of the subject vehicle satisfies the short cut-in target identification entry condition based on the driving state information of the subject vehicle.

Here, when determining whether the subject vehicle satisfies the short cut-in target identification entry condition, the short cut-in target selector may determine whether the driving state of the subject vehicle satisfies at least one of an offset driving condition, a heading driving condition, or a slalom driving condition.

For example, when determining whether the offset driving condition is satisfied, the short cut-in target selector may determine whether offset information of the subject vehicle satisfies the offset driving condition in which a valid condition is about −35 cm to about 35 cm and a non-determination condition is about −40 cm to about 40 cm.

In another example, when determining whether the heading driving condition is satisfied, the short cut-in target selector may determine whether heading information of the subject vehicle satisfies the heading driving condition in which a valid condition is about −1.8 deg to about 1.8 deg and a non-determination condition is about −2.0 deg to about 2.0 deg.

In another example, when determining whether the slalom driving condition is satisfied, the short cut-in target selector may determine whether slalom information of the subject vehicle satisfies the slalom driving condition in which a valid information of the slalom information is about −1.0 deg/s to about to deg/s and a non-determination condition is about −1.2 deg/s to about 1.2 deg/s.

When receiving offset information, heading information, and slalom information of the subject vehicle, the short cut-in target selector may determine whether lane information of the subject vehicle is valid upon receiving the lane information of the subject vehicle, and may receive the offset information, the heading information, and the slalom information of the subject vehicle when the lane information of the subject vehicle is valid.

The short cut-in target selector may identify the short cut-in target based on a driving speed of the subject vehicle, a relative speed of the target, and whether the target is moved.

For example, when the driving speed of the subject vehicle is equal to or less than about 20 kph (about 12.5 mph), the short cut-in target selector may identify the short cut-in target.

In another example, when the relative speed of the target is about −10 m/s to about 10 m/s, the short cut-in target selector may identify the short cut-in target.

In another example, when the target is a moving target that moves within about 20 m or is a stopped target that has previously moved, the short cut-in target selector may identify the short cut-in target.

As such, according to the present disclosure, the short cut-in target identification entry condition may be determined in order to remove the possibility of wrong determination when cut-in is determined using the ODM information.

According to the present disclosure, when the subject vehicle travels inclined towards one side in a driving lane, when the subject vehicle obliquely travels in the driving lane, or when the subject vehicle slalom-travels in the driving lane, if the short cut-in target identification entry condition is satisfied, a procedure of identifying a short cut-in target may be performed.

For example, as shown in FIG. 2, a basic condition design for short cut-in target identification entry is as follows, but is not limited thereto.

Here, according to the present disclosure, when lane information is valid, offset information and heading information of the subject vehicle with respect to a driving lane may be received.

First, the subject vehicle offset driving condition may have a valid condition of about −35 cm to about 35 cm and a non-determination condition of about −40 cm to about 40 cm.

Second, the subject vehicle heading driving condition may have a valid condition of about −1.8 deg to about 1.8 deg and a non-determination condition of about −2.0 deg to about 2.0 deg.

Third, the subject vehicle slalom driving condition may have a valid condition of about to deg/s to about to deg/s and a non-determination condition of about −1.2 deg/s to about 1.2 deg/s.

For example, according to the present disclosure, when the three basic determination conditions are satisfied, the procedure of identifying the short cut-in target may be performed, but the present disclosure is not limited thereto.

In another example, system specifications for performing the procedure of identifying the short cut-in target are as follows.

First, it may be possible to control the short cut-in target only when a speed of the subject vehicle is equal to or less than about 20 kph (about 12.5 mph), but the present disclosure is not limited thereto.

This is because, when the speed of the subject vehicle is equal to or greater than about 20 kph, an effect is negligible and the risk in the case of a malfunction is increased.

Second, it may be possible to control a target with a relative speed less than about 10 m/s and greater than about −10 m/s.

This is because, when the relative speed is increased, ODM information delay occurs.

Third, it may be possible to control a moving vehicle and a stopped target that has previously moved within about 20 m.

This is because it is not possible to differentiate between a structure and a stopped vehicle that has not previously moved.

Figure 3:
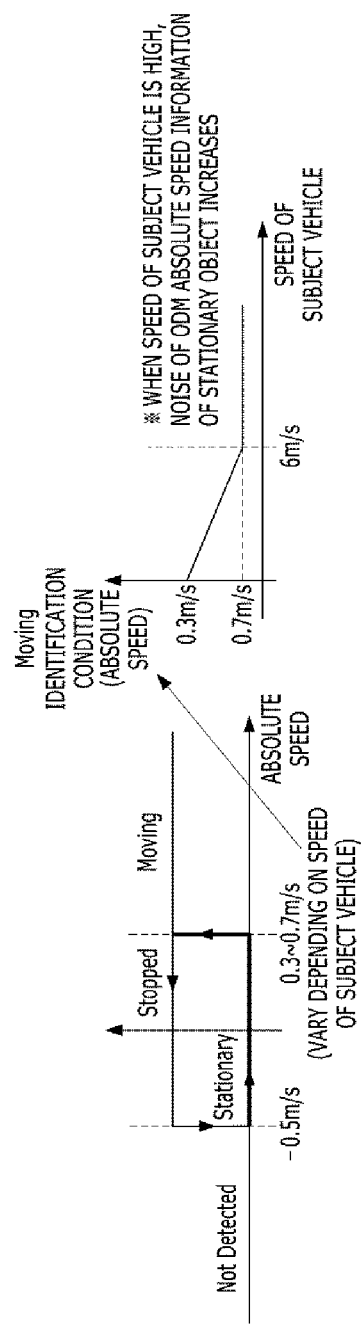
FIGS. 3 and 4 are diagrams for explaining a procedure of verifying the validity of occupancy distance map (ODM) information.
Figure 4:
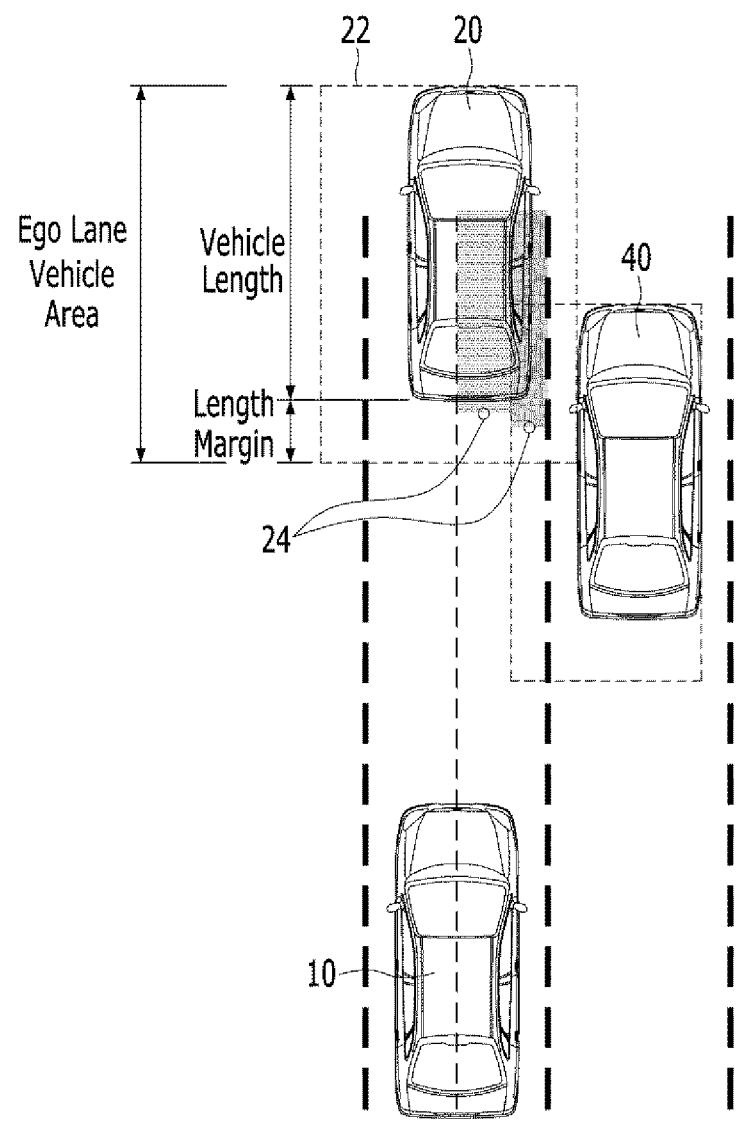

FIGS. 3 and 4 are diagrams for explaining a procedure of verifying the validity of ODM information.

As shown in FIGS. 3 and 4, when a subject vehicle satisfies a short cut-in target identification entry condition, the short cut-in target selector according to the present disclosure may verify the validity of ODM information and may remove invalid ODM information.

Here, when verifying the validity of the ODM information, the short cut-in target selector may determine the attributes of the ODM information to identify ODM information from a stationary obstacle, and may determine that the identified ODM information from the stationary obstacle is not valid.

For example, as shown in FIG. 3, when the ODM information is not measured or an absolute speed of the ODM information is measured as a value less than a first setting value, the short cut-in target selector may determine the attributes of the ODM information as Not Detected, when the absolute speed of the ODM information is measured as a value equal to or greater than a second setting value, the short cut-in target selector may determine the attributes of the ODM information as Moving, when the ODM information has been determined to have Moving attributes and the absolute speed of the ODM information is measured within a setting range, the short cut-in target selector may determine the attributes of the ODM information as Stopped, when the ODM information has not been determined to have Moving attributes and the absolute speed of the ODM information is measured as a value less than a third setting value, the short cut-in target selector may determine the attributes of the ODM information as Stationary, and when the ODM information has been determined to have Moving and Stopped attributes with a predetermined number of steps or greater and has a non-detected determination condition, the short cut-in target selector may determine the attributes of the ODM information as Coasting.

Here, the short cut-in target selector may set the first setting value to about −0.5 m/s, may select and set the second setting value from about 0.3 m/s to about 0.7 m/s, may set a setting range from about 0.5 m/s or greater to a range between about 0.3 m/s and about 0.7 m/s, may select and set the third setting value from about 0.3 m/s to about 0.7 m/s, and may set a number of steps to about 3 steps, but the present disclosure is not limited thereto.

In addition, when the attributes of the ODM information are Moving, Stopped, and Coasting, the short cut-in target selector may determine that the ODM information is valid.

When the attributes of the ODM information are Not Detected and Stationary, the short cut-in target selector may identify the ODM information as ODM information from a stationary obstacle and may determine that the identified ODM information is not valid.

If necessary, when verifying the validity of the ODM information, the short cut-in target selector may determine whether a variation in absolute speed of the ODM information is discontinuous, may identify the ODM information from a stationary obstacle, and may determine that the identified ODM information is not valid.

Here, when the attributes of the ODM information are changed to Stopped from Moving or are changed to Stationary from Moving, the short cut-in target selector may determine that the ODM information is not valid.

For example, when the attributes of the ODM information are changed to Stopped from Moving, an absolute speed of the ODM information may be from a value equal to or greater than about −0.5 m/s to a range between about 0.3 m/s and about 0.7 m/s and a variation in absolute speed may be greater than about −3 m/s.

For example, when the attributes of the ODM information are changed to Stationary from Moving, an absolute speed of the ODM information may be from a value equal to or greater than about −0.5 m/s to a range between about 0.3 m/s and about 0.7 m/s and a variation in absolute speed may be less than about −3 m/s.

When verifying the validity of the ODM information, the short cut-in target selector may identify ODM information measured by the leading ego-vehicle lane target from ODM information and may determine that the identified ODM information is not valid.

Here, as shown in FIG. 4, the short cut-in target selector may determine the attributes of ODM information present in an ego vehicle area 22 occupied by a leading ego-vehicle lane target 20 as Not Detected.

The ego vehicle area 22 occupied by the leading ego-vehicle lane target 20 may be calculated by summing a vehicle length and a length margin of the leading ego-vehicle lane target 20.

For example, the vehicle length of the leading ego-vehicle lane target 20 may be about 5 m and the length margin may be about 0.5 m to about 1.5 m, but the present disclosure is not limited thereto.

As such, according to the present disclosure, a stationary obstacle of ODM data may be identified through the procedure of verifying the validity of the ODM data.

In verification of the ODM data according to the present disclosure, the following requirements need to be met.

First, it may be required to identify ODM information from a stationary obstacle such as a road ground, a bridge joint, a small obstacle, or a guard rail.

Second, it may be required to identify whether ODM information is information from a moving object or information from a stopped object that has previously moved.

This is because ODM information is transmitted irrespective of a reflected object.

Here, ODM information for identifying short cut-in may use only information from a vehicle.

Then, as shown in FIG. 3, according to the present disclosure, logic for verifying validity of ODM data may be designed as follows.

That is, according to the present disclosure, in order to verify the ODM data, the attributes of ODM information may be determined for each region.

Here, according to the present disclosure, ODM information may be used as valid information when the attributes of the ODM information are Moving, Stopped, and Coasting.

First, the attributes of the ODM information may be determined as Not Detected when the ODM information is not measured or an absolute speed is measured as a value less than about −0.5 m/s.

Second, the attributes of the ODM information may be determined as Moving when an absolute speed is measured as a value equal to or greater than about 0.3 m/s (to about 0.7 m/s), which is a variable condition with respect to a speed of a subject vehicle.

Third, the attributes of the ODM information may be determined as Stopped when the attributes of the ODM information have been determined as Moving before and an absolute speed is measured as a value equal to or greater than about −0.5 m/s and less than 0.3 m/s (to about 0.7 m/s).

Fourth, the attributes of the ODM information may be determined as Stationary when the attributes of the ODM information have not been determined as Moving before and an absolute speed is measured as a value less than about 0.3 m/s (to about 0.7 m/s), which is a variable condition with respect to a speed of a subject vehicle.

Fifth, the attributes of the ODM information may be determined as Coasting when the attributes of the ODM information have been determined as Moving/Stopped with about three steps (about 150 ms) or greater and a current determination condition is Not Detected, previous measurement information may be held.

According to the present disclosure, when a variation in absolute speed is identified to be discontinuous (that is, when a vehicle is measured and then a stationary obstacle is measured), the ODM information may be determined to be invalid.

First, the corresponding case is a case in which the attributes of ODM information are changed to Stopped from Moving.

For example, an absolute speed is about −0.5 m/s to about 0.3 m/s (to about 0.7 m/s) and a variation thereof is greater than about −3 m/s, and the variation is reduced in a negative direction.

Second, the corresponding case is a case in which the attributes of ODM information are changed to Stationary from Moving.

For example, an absolute speed is about −0.5 m/s to about 0.3 m/s (to about 0.7 m/s) and a variation thereof is less than about −3 m/s, and the variation is increased in a negative direction.

As shown in FIG. 4, according to the present disclosure, ODM information 24 measured by the leading ego-vehicle lane target 20 may be identified through the procedure of verifying the validity of ODM data.

According to the present disclosure, as requirements for verifying the validity of ODM data, the ODM information 24 measured by the leading ego-vehicle lane target 20 needs to be identified.

This is because the ODM information 24 from the leading ego-vehicle lane target 20 may be matched to a target 40 of a left/right lane to cause wrong determination as short cut-in.

Here, the leading ego-vehicle lane target 20 is a basic longitudinal control target, and thus it is not necessary to identify the leading ego-vehicle lane target 20 as a short cut-in target.

Then, according to the present disclosure, logic for verifying validity of ODM data may be designed as follows.

That is, according to the present disclosure, the ODM information 24 present in the ego vehicle area 22 occupied by the leading ego-vehicle lane target 20 may be determined as Not Detected.

The ego vehicle area 22 occupied by the leading ego-vehicle lane target 20 may be calculated as follows.

Area occupied by leading ego-vehicle lane target (Ego Vehicle Area)=Vehicle Length (e.g., about 5 m)+Length Margin (e.g., about 0.5 to about 1.5 m).

Here, the ODM information 24 from the leading ego-vehicle lane target 20 may be acquired in consideration of an error in longitudinal position information, and in this regard, when a relative speed is increased, the error may be increased.

Figure 5:
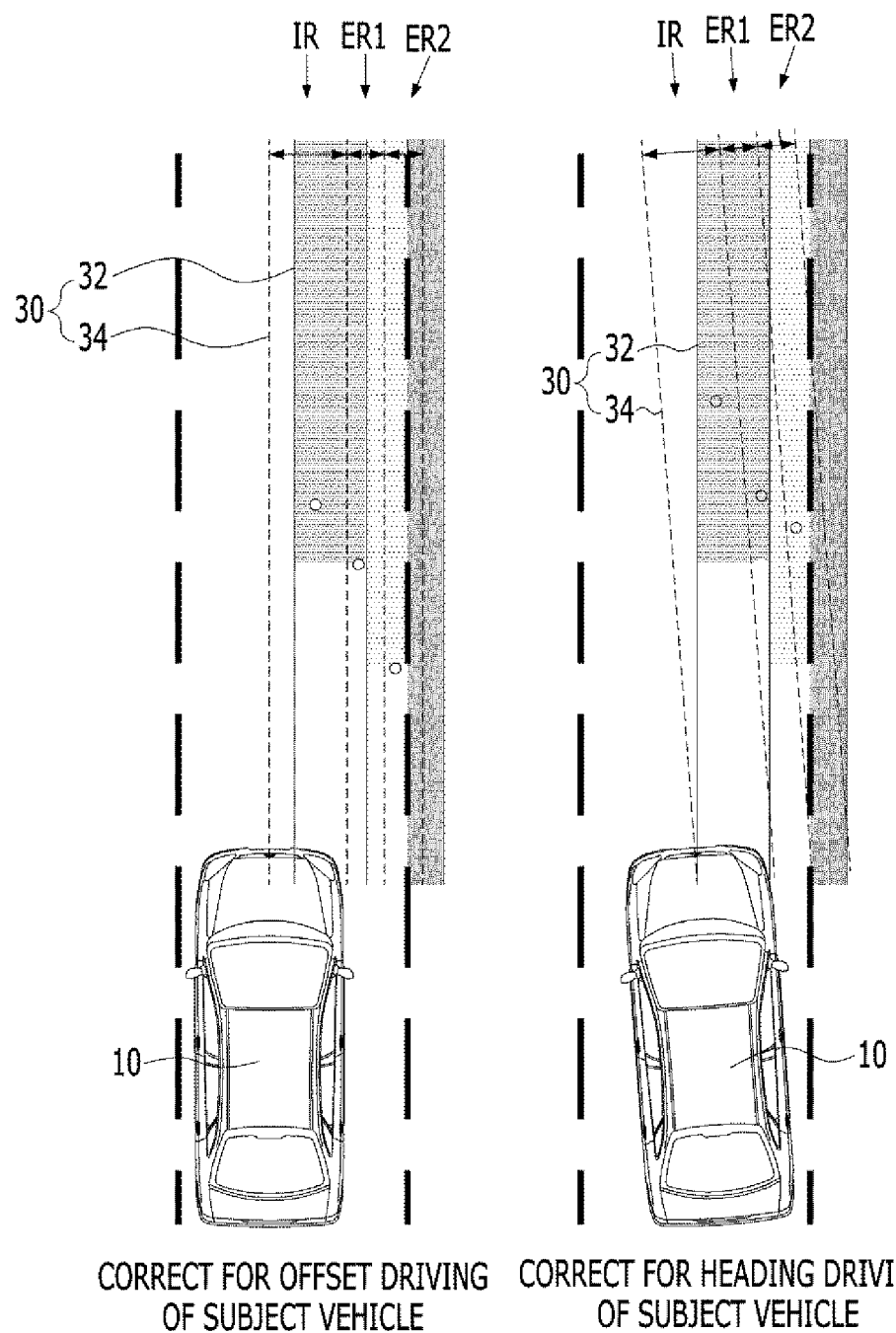
FIGS. 5 and 6 are diagrams for explaining a procedure of correcting ODM information.
Figure 6:
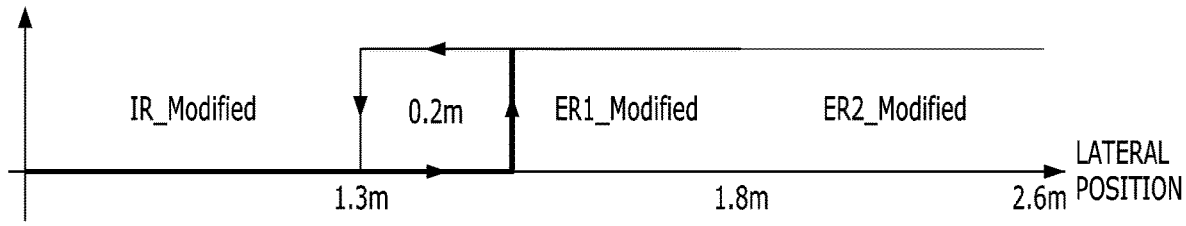

FIGS. 5 and 6 are diagrams for explaining a procedure of correcting ODM information.

As shown in FIGS. 5 and 6, a short cut-in target selector according to the present disclosure may correct the ODM information based on the driving state of a subject vehicle.

Here, when correcting the ODM information, the short cut-in target selector may correct the ODM information based on at least one of offset information or heading information of the subject vehicle.

That is, when correcting the ODM information, the short cut-in target selector may rearrange ODM information including a grid map 30 based on a coordinate system with respect to a driving lane.

As shown in FIG. 5, a grid map 32 before correction of ODM information may be rearranged to a grid map 34 after correction of ODM information through correction of ODM data.

For example, when rearranging the ODM information, the short cut-in target selector may correct the width of an internal region IR of the grid map 30 to about 0 to about 1.3 m, may correct the width of a first external region ER 1 to about 1.3 m to about 1.8 m, and may correct the width of a second external region ER 2 of the grid map 30 to about 1.8 m to about 2.6 m.

When correcting the width of the internal region IR and the first external region ER 1 of the grid map 30, the short cut-in target selector may apply a margin value of about 0.2 M.

As such, in correction of the ODM data according to the present disclosure, the following requirements need to be met.

First, according to the present disclosure, within a range in which a basic determination condition of a short cut-in target is satisfied, a short cut-in target should not be wrongly recognized due to a behavior of a subject vehicle including subject vehicle offset or subject vehicle heading.

Second, according to the present disclosure, ODM information needs to be converted and processed into a coordinate system with respect to a driving lane in a subject vehicle coordinate system.

This is because transmitted ODM information is relative information based on the subject vehicle coordinate system.

According to the present disclosure, logic for correcting ODM data may be designed as follows.

First, ODM information may be converted into a coordinate system with respect to a driving lane using a longitudinal/lateral position measurement value for each region.

For example, subject vehicle offset and subject vehicle heading information transmitted from a camera of the subject vehicle may be used.

Second, as shown in FIG. 6, ODM data may be rearranged based on the coordinate system with respect to the driving lane.

For example, when ODM data is rearranged, the width of regions IR, ER1, and ER2 may be designed as follows: IR_Modified=0 to 1.3 m, ER1_Modified=1.3 m to 1.8 m, ER2_Modified=1.8 m to 2.6 m.

When IR_Modified and ER1_Modified are determined, Hysteresis may be applied, and for example, may be about 0.2 M.

Figure 7:
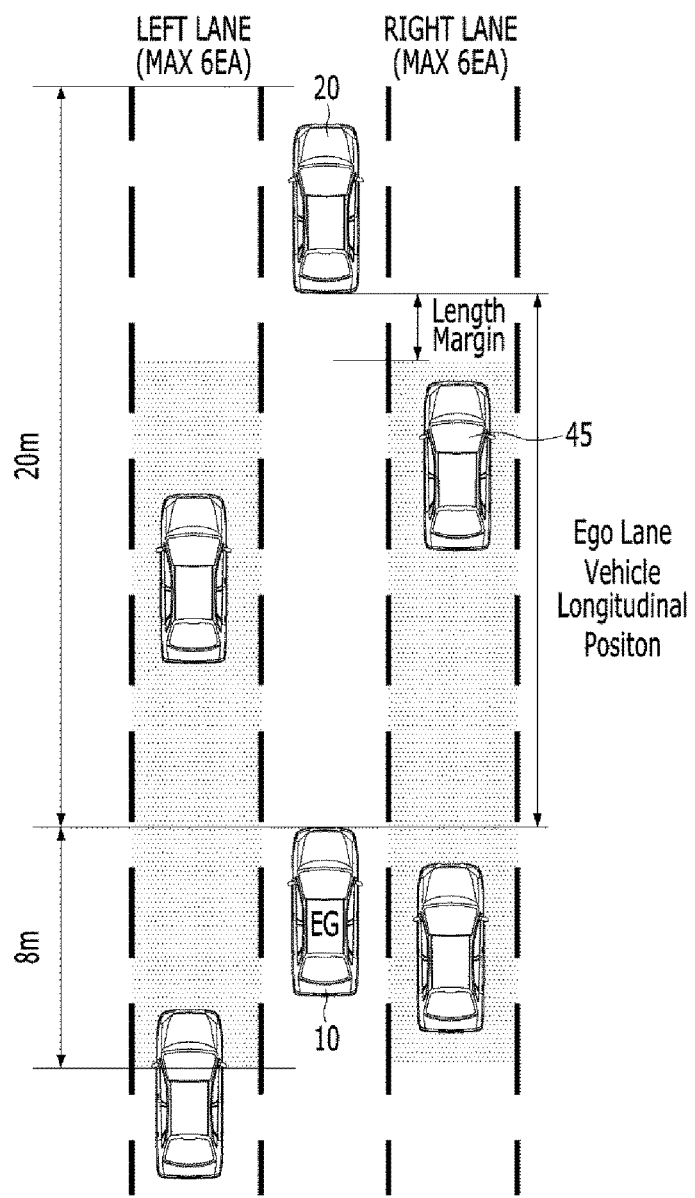
FIG. 7 is a diagram for explaining a procedure of selecting an ODM track candidate group.

FIG. 7 is a diagram for explaining a procedure of selecting an ODM track candidate group.

As shown in FIG. 7, a short cut-in target selector according to the present disclosure may select an ODM track candidate group including a plurality of candidate tracks 45 based on track information.

Here, when selecting the ODM track candidate group, the short cut-in target selector may select tracks of left and right lanes based on a subject vehicle lane among a plurality of sensor fusion tracks as the ODM track candidate group based on the track information.

That is, when selecting the ODM track candidate group, the short cut-in target selector may select tracks present in a specific distance period as an ODM track candidate group based on measurement at a longitudinal position of a left and right lane target.

For example, the specific distance period may be a distance period of about −8 m to about 20 M.

Here, among the tracks present in the specific distance period, tracks corresponding to a maximum of six vehicles for each lane based on a vehicle length of 5 m may be selected as an ODM track candidate group.

When selecting the ODM track candidate group, the short cut-in target selector may select the candidate tracks 45 in a distance period of left and right lanes, which is closer to a longitudinal position than a position of the leading ego-vehicle lane target 20 as the ODM track candidate group.

Here, the distance period closer to the longitudinal position than the position of the leading ego-vehicle lane target may be about −8 m to (longitudinal position of vehicle in leading ego-vehicle lane−length margin) m.

For example, (longitudinal position of vehicle in leading ego-vehicle lane−length margin) m may be about 3 m, but is not limited thereto.

Then, when measuring positions of tracks of left and right lanes, the short cut-in target selector may set a reference for measuring a position of tracks in left and right lanes to the center of a rear bumper.

When selecting the ODM track candidate group, the short cut-in target selector may exclude sensor fusion tracks positioned farther than the leading ego-vehicle lane target from the ODM track candidate group.

As such, in the selection of the ODM track candidate group according to the present disclosure, the following requirements need to be met.

First, according to the present disclosure, a candidate track for determining whether short cut-in is performed needs to be selected among about 64 sensor fusion tracks.

Second, according to the present disclosure, sensor fusion tracks positioned farther than the leading ego-vehicle lane target need to be excluded from the short cut-in determination candidate group.

That is, this is because whether short cut-in is performed needs to be determined only with respect to a track having the possibility of short cut-in.

According to the present disclosure, logic for correcting ODM data may be designed as follows.

First, according to the present disclosure, tracks in left/right lanes may be selected from among about 64 sensor fusion tracks.

Here, according to the present disclosure, intermediate information calculated by a target object selection (TOS) module may be used, and a track may be calculated based on a lateral position of the center of a lane.

The track calculated by the TOS module may be a Moving track or a Stopped track that has previously moved.

Second, according to the present disclosure, when a track is present in a period of about −8 m to about 20 m based on a reference for measuring a longitudinal position of a left/right lane, the corresponding track may be selected as a candidate group.

For example, based on a vehicle length of 5 m, a maximum of six tracks for each lane may be selected as a candidate group.

A left/right lane track closer to the longitudinal position than the position of the leading ego-vehicle lane target 20 may be selected as a candidate group.

For example, when a track is present in a specific period based on the reference for measuring a longitudinal position of a left/right lane target, the specific period may be −8 m to {Ego Lane Vehicle Longitudinal Position−Length Margin (3 m)}.

Here, the reference for measuring the position of a track may be the center of a rear bumper.

Figure 8:
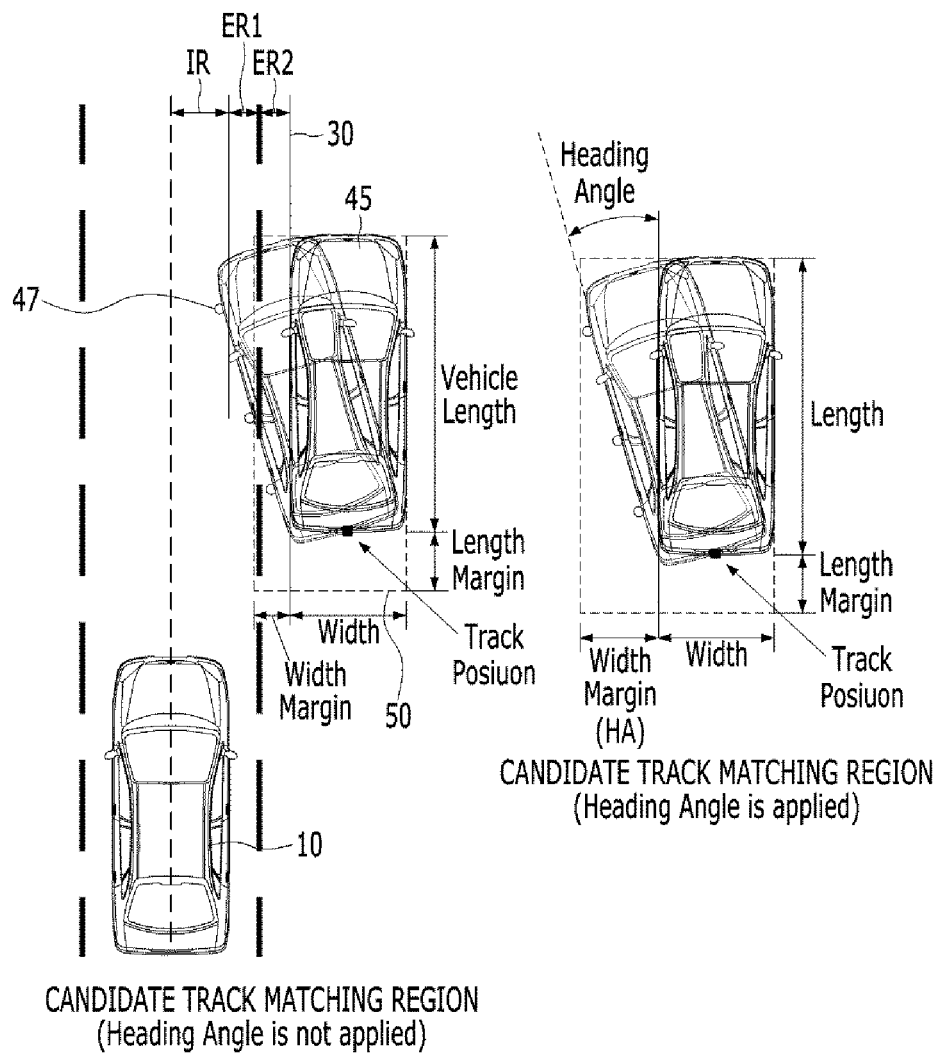
FIGS. 8 and 9 are views for explaining a procedure of matching ODM information and a candidate track to each other.
Figure 9:
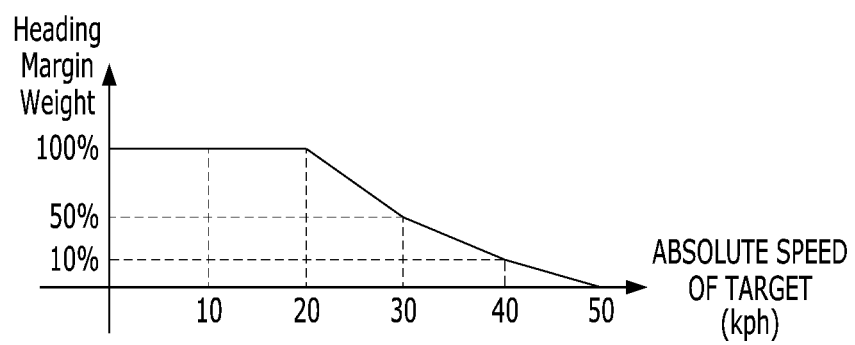

FIGS. 8 and 9 are views for explaining a procedure of matching ODM information and a candidate track to each other.

As shown in FIG. 8, a short cut-in target selector according to the present disclosure may match each of the candidate tracks 45 and an ODM object 47 corresponding thereto to the grid map 30 of ODM information.

When identifying short cut-in of a candidate track, the short cut-in target selector may add a margin value to the length and width of each of the candidate tracks 45 to set a candidate track matching region 50, and may identify short cut-in of the candidate tracks 45 based on the set candidate track matching region 50.

Here, when setting the candidate track matching region 50, the short cut-in target selector may sum the length of the candidate tracks 45 and the length margin to set a longitudinal region of the candidate track matching region 50, and may sum the width of the candidate tracks 45 and a width margin to set a lateral region of the candidate track matching region 50.

For example, the longitudinal region of the candidate track matching region 50 may be set by summing a length of 5 m of the candidate tracks 45 and about 1 m of the length margin, and the lateral region of the candidate track matching region 50 may be set by summing a width of about 2 m of the candidate track 45 and a width margin of about 0.8 m.

When identifying short cut-in of the candidate tracks 45, the short cut-in target selector may add a width margin for heading to the width of each of the candidate tracks 45 to set the candidate track matching region 50, and may identify short cut-in of the candidate track 45 based on the set candidate track matching region 50.

Here, when setting the candidate track matching region 50, the short cut-in target selector may multiply the length of the candidate tracks 45 and a heading angle of the candidate tracks 45 to calculate a width margin value for heading, and may sum the calculated width margin value for heading and the width of the candidate tracks 45 to set a lateral region of the candidate track matching region 50.

For example, the width margin value for heading may be set by multiplying a length of the candidate tracks 45, that is 5 m, by a heading angle.

As shown in FIG. 9, when calculating the width margin value for heading, the short cut-in target selector may also apply a weight for an absolute speed of a target.

As such, in matching between ODM information and a candidate track according to the present disclosure, the following requirements need to be met.

First, according the present disclosure, when a measurement position of ODM information including the ODM object 47 is present in a matching region between the candidate tracks 45 and the grid map 30, short cut-in needs to be identified.

Second, according the present disclosure, when ODM information is not present, short cut-in does not need to be identified.

Third, according the present disclosure, after short cut-in is identified, when ODM information is unstable, identification of a short cut-in target also needs to be maintained.

Fourth, according to the present disclosure, after short cut-in is identified, when information of a candidate track is unstable, identification of a short cut-in target also needs to be maintained.

According to the present disclosure, logic for matching ODM information and a candidate track may be designed as follows.

First, according to the present disclosure, a margin may be added to the length and width of the candidate tracks 45 to set the candidate track matching region 50, which may be performed based on a measurement position of the candidate track.

That is, the longitudinal region of the candidate tracks 45 may be set by summing Length (5 m) and Length Margin (1.0 m).

In addition, the lateral region of the candidate tracks 45 may be set by summing Width (2 m)+Width Margin (0.8 m).

Second, a width margin for heading of a candidate track may be added to set the candidate track matching region 50, and in this case, the width margin for heading may be applied only when the width margin for heading is greater than a general width margin.

That is, the width margin for heading may be calculated as follows.

Width Margin (HA)=Length (5 m)×sin (track Heading Angle).

Here, as shown in FIG. 9, when the width margin for heading of the candidate track is added to set the candidate track matching region 50, a weight for an absolute speed of a target may also be applied.

This is because the incidence of incorrect recognition needs to be reduced.

Figure 10:
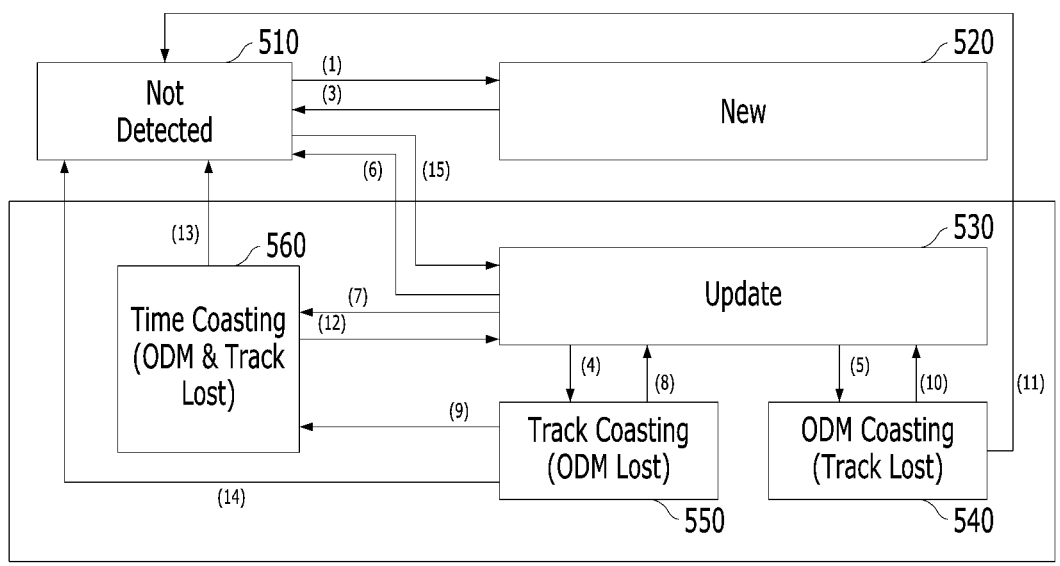
FIG. 10 is a diagram for explaining a procedure of identifying short cut-in of a candidate track.

FIG. 10 is a diagram for explaining a procedure of identifying short cut-in of a candidate track.

As shown in FIG. 10, a short cut-in target selector according to the present disclosure may match each candidate track and an ODM object corresponding thereto to a grid map of ODM information to identify short cut-in of the candidate track.

That is, when identifying short cut-in of a candidate track, the short cut-in target selector may match each candidate track and an ODM object corresponding thereto to a grid map, and may determine a short cut-in state of each candidate track based on matching.

Here, when determining the short cut-in state of each candidate track, the short cut-in target selector may determine the short cut-in state of the candidate track to be any one of an undetected state 510, a new state 520, an update state 530, a track coasting state 550, an ODM coasting state 540, and a time coasting state 560, based on the matching.

For example, when ODM information or a candidate track is present, the short cut-in target selector may determine the short cut-in state of the candidate track to be the undetected state 510.

Here, when the candidate track and an ODM object corresponding thereto are matched to an internal region IR of a grid map, the short cut-in target selector may transition the short cut-in state from the undetected state 510 to the new state 520 and may determine the short cut-in state of the candidate track, as indicated by (1) of FIG. 10.

When a track identified for general cut-in is the same as a candidate track and the candidate track is matched to a first external region ER1 of a grid map, the short cut-in target selector may transition the short cut-in state from the undetected state 510 to the update state 530 to determine the short cut-in state of the candidate track, as indicated by (15) of FIG. 10.

Then, when a candidate track and an ODM object corresponding thereto are matched to an internal region IR of the grid map, the short cut-in target selector may determine the short cut-in state of the candidate track as the new state 520.

Here, when the new state is maintained for a predetermined time or a predetermined number of steps, the short cut-in target selector may transition from the new state 520 to the update state 530 and may determine the short cut-in state of the candidate track, as indicated by (2) of FIG. 10.

For example, when the new state 520 is maintained for about 0.25 s or about five steps, the short cut-in target selector may transition from the new state 520 to the update state 530.

When matching with the internal region IR of the grid map is released before the new state 520 is maintained for a predetermined time or a predetermined number of steps, the short cut-in target selector may transition from the new state 520 to the undetected state 510 and may determine the short cut-in state of the candidate track, as indicated by (3) of FIG. 10.

For example, when matching with the internal region IR of the grid map is released before the new state 520 is maintained for about 0.25 s or about 5 steps, the short cut-in target selector may transition from the new state 520 to the undetected state 510, as indicated by (3) of FIG. 10.

Then, when a candidate track and an ODM object corresponding thereto are matched to the internal region IR or the first external region ER1 of the grid map, the short cut-in target selector may identify short cut-in of the candidate track as the update state.

When the ODM object corresponding to the candidate track is lost and matching with the grid map is released, the short cut-in target selector may transition from the update state 530 to the track coasting state 550 and may determine a short cut-in state of the candidate track, as indicated by (4) of FIG. 10.

When the candidate track is lost and matching with the grid map is released while the subject vehicle is stopped and the candidate track is stopped, the short cut-in target selector may transition from the update state 530 to the ODM coasting state 540 and may determine the short cut-in state of the candidate track, as indicated by (5) of FIG. 10.

When the candidate track is lost and matching with the grid map is released while the subject vehicle is moved or the candidate track is moved, the short cut-in target selector may transition from the update state 530 to the undetected state 510 and may determine the short cut-in state of the candidate track, as indicated by (6) of FIG. 10.

Then, when both the candidate track and the ODM object corresponding thereto are lost while the subject vehicle is stopped or the candidate track is stopped and matching with the grid map is released, the short cut-in target selector may transition from the update state 530 to the time coasting state 560 and may determine the short cut-in state of the candidate track, as indicated by (7) of FIG. 10.

Then, when the ODM object corresponding to the candidate track is lost and matching with the grid map is released, the short cut-in target selector may determine the short cut-in state of the candidate track as the track coasting state 550.

When the ODM object corresponding to the candidate track is recovered and is matched to the internal region IR or the first external region ER1 of the grid map, the short cut-in target selector may transition from the track coasting state 550 to the update state 530 and may determine the short cut-in state of the candidate track, as indicated by (8) of FIG. 10.

For example, when matching between the ODM object corresponding to the candidate track and the grid map is maintained for a predetermined time or a predetermined number of steps, the short cut-in target selector may transition from the track coasting state 550 to the update state 530, as indicated by (8) of FIG. 10.

Here, the short cut-in target selector may maintain matching between the ODM object corresponding to the candidate track and the grid map for about 0.15 s or about three steps, but the present disclosure is not limited thereto.

When the candidate track is lost while the subject vehicle is stopped and the candidate track is stopped, the short cut-in target selector may transition from the track coasting state 550 to the time coasting state 560 and may determine the short cut-in state of the candidate track, as indicated by (9) of FIG. 10.

When the candidate track is lost while the subject vehicle is moved or the candidate track is moved and matching with the grid map is released, the short cut-in target selector may transition from the track coasting state 550 to the undetected state 510 and may determine the short cut-in state of the candidate track, as indicated by (14) of FIG. 10.

Then, when the candidate track is lost and matching with the grid map is released while the subject is stopped and the candidate track is stopped, the short cut-in target selector may determine the short cut-in state of the candidate track as the ODM coasting state 540.

Here, when the candidate track is recovered and is matched with the internal region IR or the first external region ER1 of the candidate track, the short cut-in target selector may transition from the ODM coasting state 540 to the update state 530 and may determine the short cut-in state of the candidate track, as indicated by (10) of FIG. 10.

For example, when matching between the candidate track and the grid map is maintained for a predetermined time or a predetermined number of steps, the short cut-in target selector may transition from the ODM coasting state 540 to the update state 530, as indicated by (10) of FIG. 10.

Here, the short cut-in target selector may maintain matching between the candidate track and the grid map for about 0.15 s or about three steps, but the present disclosure is not limited thereto.

When the ODM object corresponding to the candidate track is rapidly changed, the ODM object corresponding to the candidate track disappears, or the subject vehicle is moved irrespective of time, the short cut-in target selector may transition from the ODM coasting state 540 to the undetected state 510 and may determine the short cut-in state of the candidate track, as indicated by (ii) of FIG. 10.

Here, when the ODM object corresponding to the candidate track is rapidly changed earlier than about 1 s after entering or the ODM object corresponding to the candidate track disappears later than about 1 s after entering, the short cut-in target selector may transition from the ODM coasting state 540 to the undetected state 510 and may determine the short cut-in state of the candidate track, as indicated by (ii) of FIG. 10.

Then, when both the candidate track and the ODM object corresponding thereto are lost while the subject vehicle is stopped or the candidate track is stopped and matching with the grid map is released, the short cut-in target selector may determine the short cut-in state of the candidate track as the time coasting state 560.

Here, when both the candidate track and the ODM object corresponding thereto are recovered and are matched to the internal region IR or the first external region ER1 of the grid map, the short cut-in target selector may transition from the time coasting state 560 to the update state 530 and may determine the short cut-in state of the candidate track, as indicated by (12) of FIG. 10.

For example, when matching between the candidate track and the ODM object corresponding thereto and the grid map is maintained for a predetermined time or a predetermined number of steps, the short cut-in target selector may transition from the time coasting state 560 to the update state 530, as indicated by (12) of FIG. 10.

Here, the short cut-in target selector may maintain matching between the candidate track and the ODM object corresponding thereto for about 0.15 s or about three steps, but the present disclosure is not limited thereto.

When matching with the grid map is maintained for a predetermined time or a predetermined number of steps or the subject vehicle is moved in the time coasting state 560, the short cut-in target selector may transition from the time coasting state 560 to the undetected state 510 and may determine the short cut-in state of the candidate track, as indicated by (13) of FIG. 10.

Here, the short cut-in target selector may maintain matching with the grid map for about 1 s or about 20 steps in the time coasting state, but the present disclosure is not limited thereto.

Figure 11:
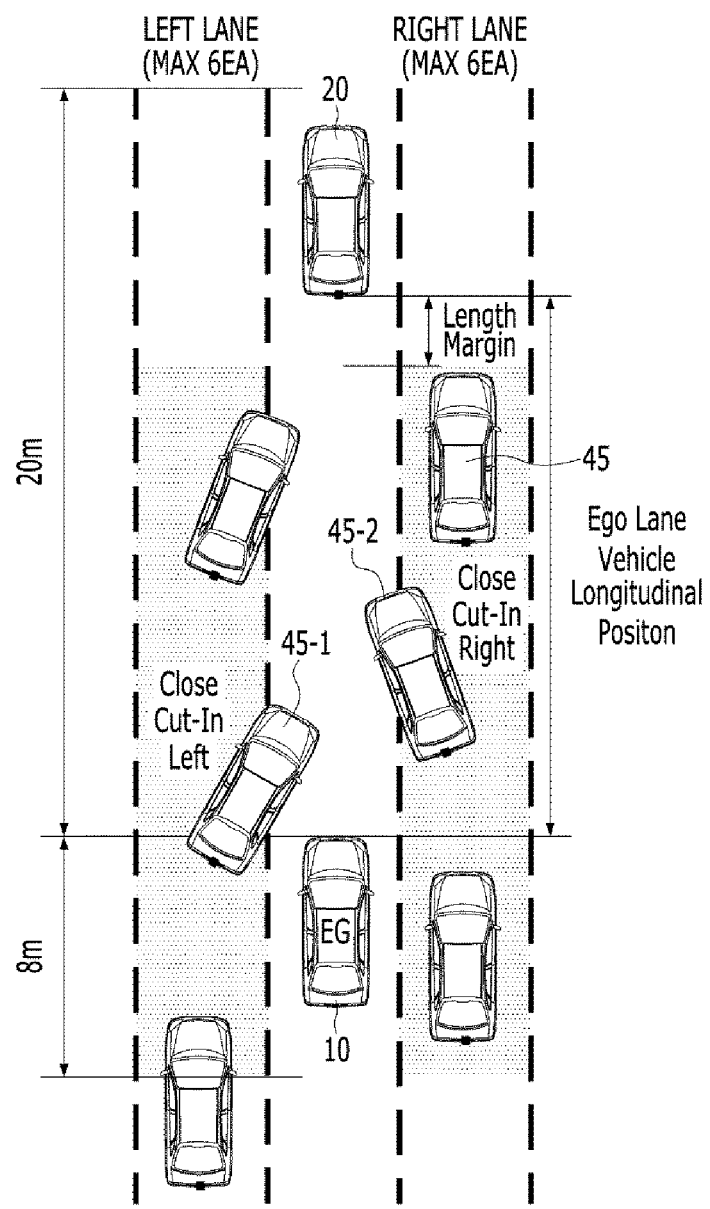
FIG. 11 is a diagram for explaining a procedure of determining a short cut-in target.

FIG. 11 is a diagram for explaining a procedure of determining a short cut-in target.

As shown in FIG. 11, a short cut-in target selector according to the present disclosure may determine a short cut-in target from short cut-in candidate tracks and may output the determined short cut-in target information.

Here, when identifying the short cut-in target, the short cut-in target selector may determine the candidate track closest to a subject vehicle 10 as the short cut-in target among the candidate tracks 45 identified for short cut-in in left and right lanes based on the subject vehicle lane.

For example, when determining the short cut-in target, the short cut-in target selector may select a first candidate track 45-1 closest to the subject vehicle 10 among the candidate tracks 45 identified for short cut-in in left and right lanes based on the subject vehicle lane, may select a second candidate track 45-2 closest to the subject vehicle 10 among the candidate tracks 45 identified for short cut-in in a right lane based on the subject vehicle lane, and may determine two candidate tracks including the first and second candidate tracks 45-1 and 45-2 as a short cut-in target.

When outputting the determined short cut-in target information, the short cut-in target selector may calculate position information and relative speed information based on a measurement point of the short cut-in target, and may output short cut-in target information including the calculated position and relative speed information.

As such, in the determination of the short cut-in target and transmission of information according to the present disclosure, the following requirements need to be met.

First, according to the present disclosure, the closest track among tracks identified for short cut-in in left/right lanes may be selected as a short cut-in target.

Second, according to the present disclosure, each short cut-in target may be selected in left/right lanes, and two pieces of target information may be transmitted to a controller.

Third, according to the present disclosure, position and relative speed information may be calculated using target information based on a measurement point of a track.

According to the present disclosure, the short cut-in target may be determined, and a log for transmitting information may be designed as follows.

First, according to the present disclosure, when a short cut-in target is determined, the closest candidate track, among candidate tracks identified as Detected, may be selected.

Second, information transmitted to a controller may be as follows:

LEFT/RIGHTCloseCutInTgt_Status_L/R: State of left/right targets;
0x0: Not Detected;
0x1: New;
0x2: Update;
0x3: Coasting (ODM Lost);
0x0: Coasting (Track Lost);
0x5: Coasting (ODM Lost & Track Lost, Time Coasting);
CloseCutInTgt_RelPos_L/R: Relative distance of left/right target, mps (track information is transmitted);
CloseCutInTgt_RelSpd_L/R: relative speed of left/right target, mps (track information is transmitted).

Figure 12:
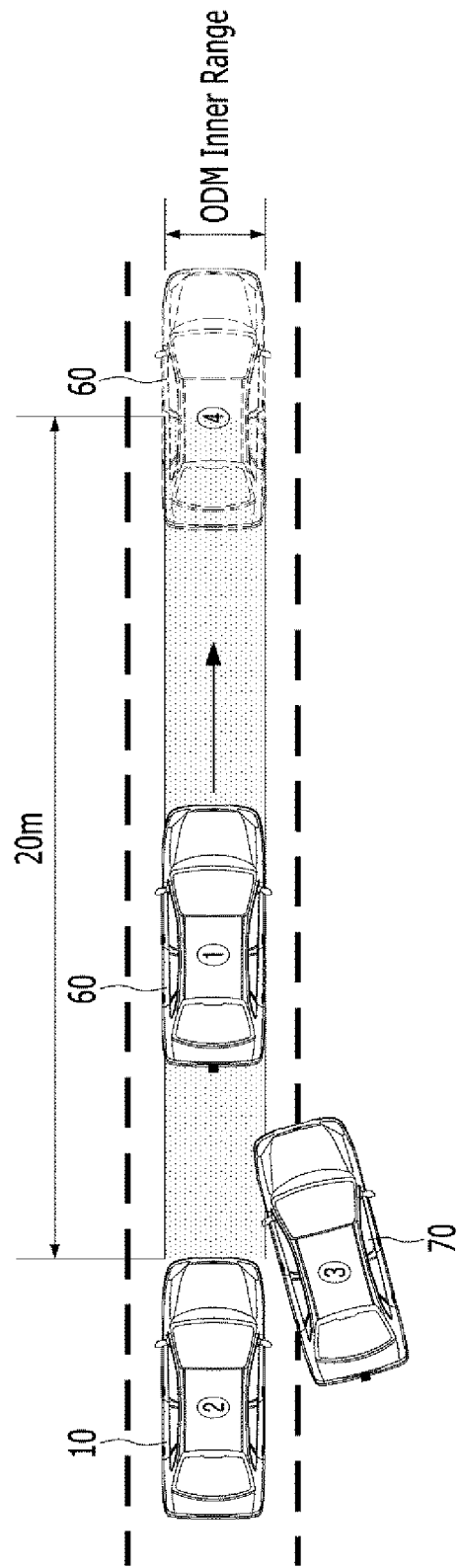
FIGS. 12 to 14 are diagrams for explaining application of a short cut-in target identification apparatus according to an embodiment of the present disclosure.
Figure 13:
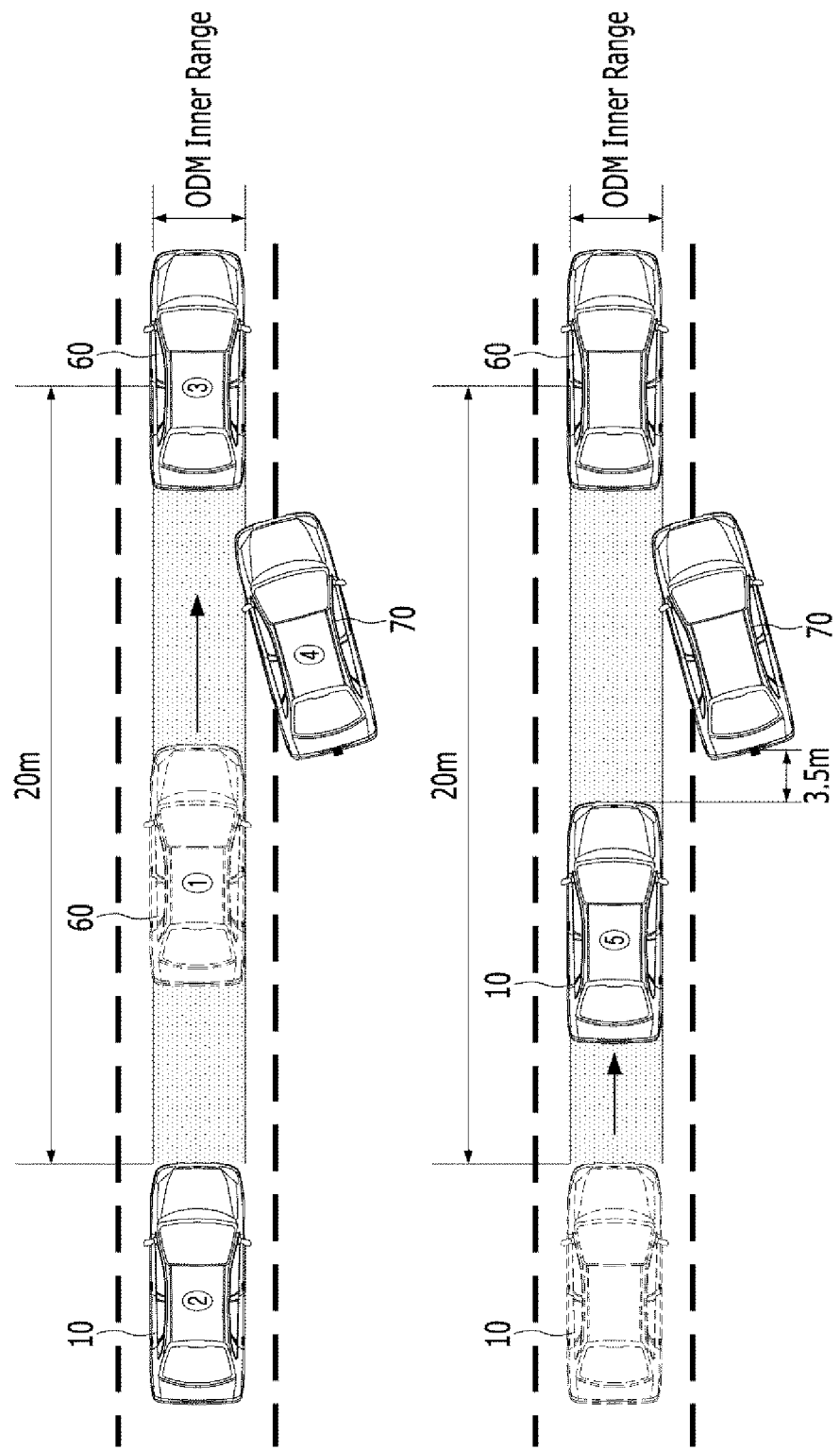
Figure 14:
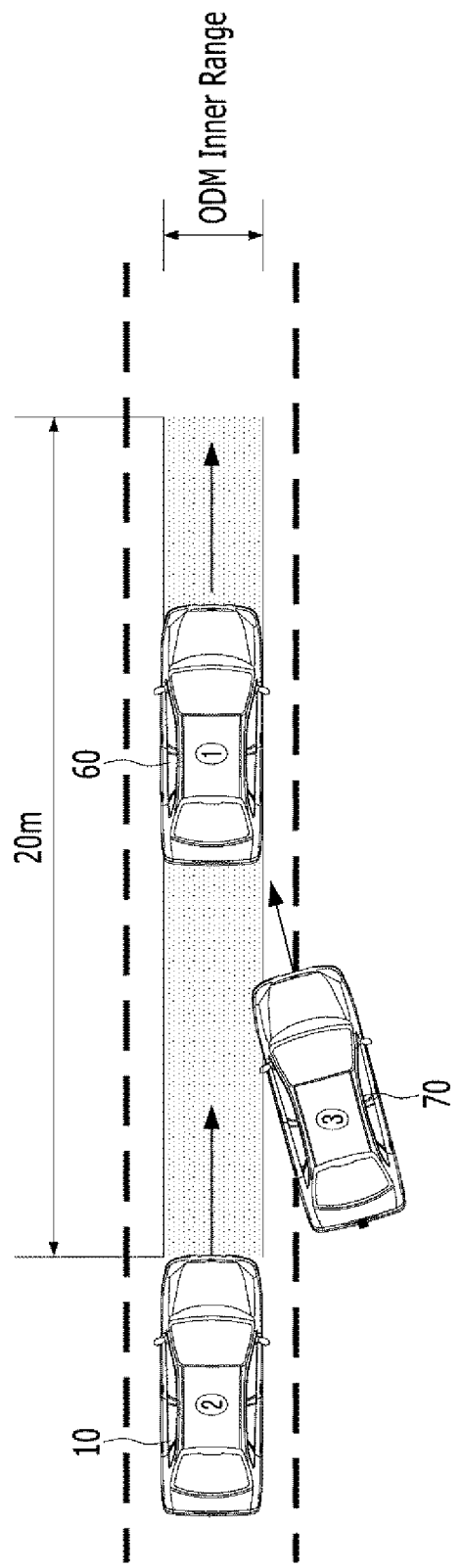

FIGS. 12 to 14 are diagrams for explaining application of a short cut-in target identification apparatus according to an embodiment of the present disclosure.

FIG. 12 is a diagram for explaining a first scenario of identifying a short cut-in vehicle in left/right lanes while stoppage of the subject vehicle is controlled.

As shown in FIG. 12, as a first operation, a leading vehicle 60 may be stopped while the subject vehicle 10 performs track control on a leading vehicle 60.

Then, as a second operation, the subject vehicle 10 may perform stop control at an interval of about 2.5 m to about 3.5 m from the leading vehicle 60.

Then, as a third operation, the short cut-in target identification apparatus of the subject vehicle 10 may recognize a short cut-in vehicle 70.

In addition, as a fourth operation, when the leading vehicle 60 starts, the subject vehicle 10 may be maintained to be stopped after the leading vehicle 60 is stopped, thereby preventing crash with the short cut-in vehicle 70.

Here, the subject vehicle 10 may perform control to prevent starting even upon receipt of a start command (manipulation of +/−RES switch and Accel. Pedal) in a hold state.

FIG. 13 is a diagram for explaining a second scenario of identifying a short cut-in vehicle in left/right lanes when a leading vehicle moves and then stops during stop control of a subject vehicle.

As shown in FIG. 13, as a first operation, the leading vehicle 60 may be stopped while the subject vehicle 10 performs track control.

Then, as a second operation, the subject vehicle 10 may perform stop control at an interval of about 2.5 m to about 3.5 m from the leading vehicle 60.

Then, as a third operation, the subject vehicle 10 may enter a hold state and may then remain stopped after the leading vehicle 60 starts.

As a fourth operation, the short cut-in target identification apparatus of the subject vehicle 10 may recognize the short cut-in vehicle 70.

Then, as a fifth operation, the subject vehicle 10 may start in response to a start command (manipulation of +/−RES switch and Accel. Pedal), and may perform stop control at an interval of about 2.5 m to about 3.5 m from the already recognized short cut-in vehicle 70.

FIG. 14 is a diagram for explaining a third scenario of identifying a short cut-in vehicle in left/right lanes during leading vehicle track control of a subject vehicle.

As shown in FIG. 14, as a first operation, the leading vehicle 60 may travel at about 20 kph or less.

Then, as a second operation, the subject vehicle 10 may perform track control of the leading vehicle 60.

Then, as a third operation, the short cut-in target identification apparatus of the subject vehicle 10 may recognize the short cut-in vehicle 70.

In addition, the subject vehicle 10 may perform acceleration and deceleration control on the already recognized short cut-in vehicle 70.

As such, according to the present disclosure, various situations of a counterpart vehicle that cuts in at a low speed from a short distance may be accurately determined, thereby enhancing reliability and safety.

Figure 15:
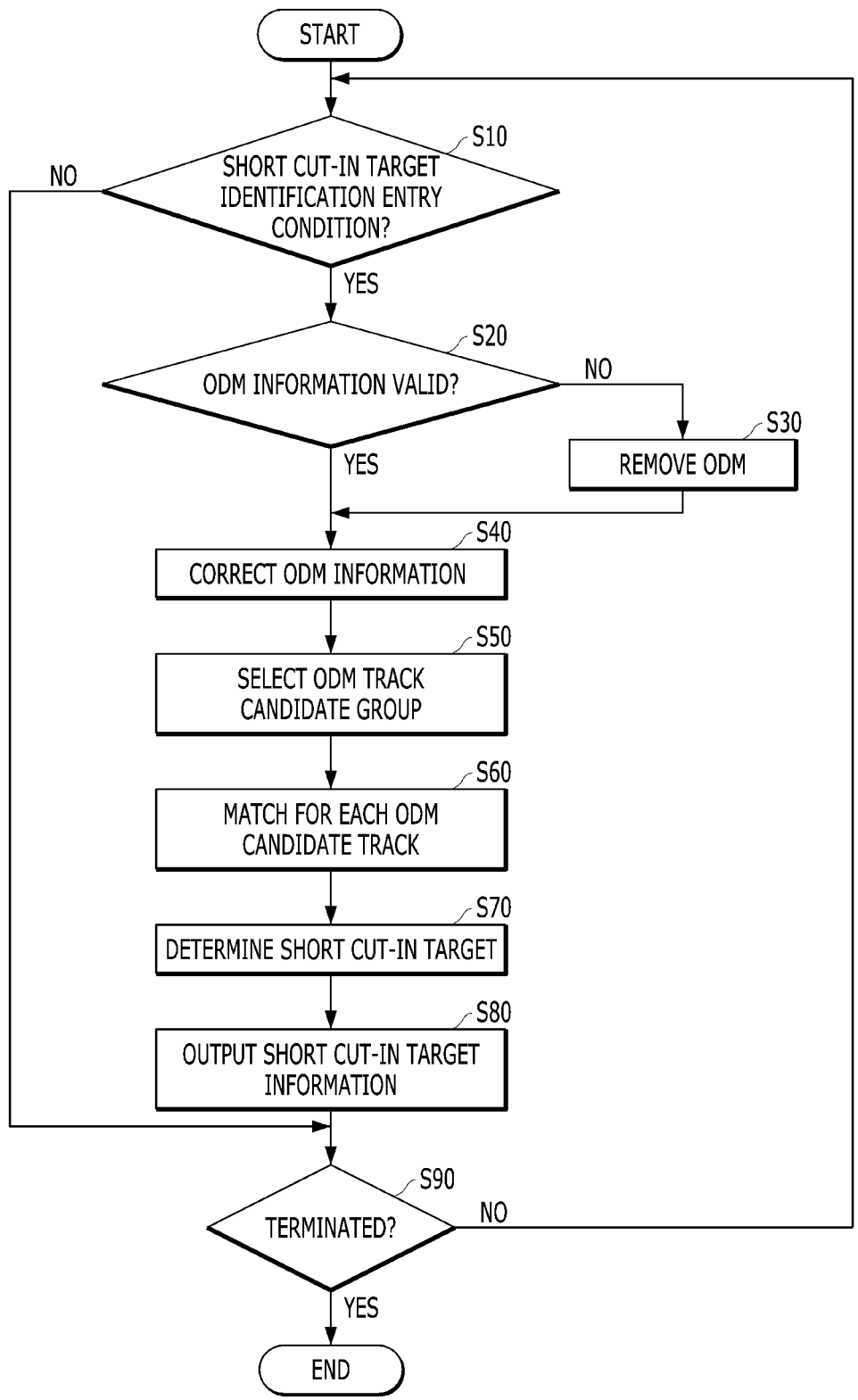
FIG. 15 is a flowchart for explaining a method of identifying a short cut-in target according to the present disclosure.

FIG. 15 is a flowchart for explaining a method of identifying a short cut-in target according to the present disclosure.

As shown in FIG. 15, according to the present disclosure, whether a subject vehicle satisfies a short cut-in target identification entry condition may be determined (S10).

Here, according to the present disclosure, driving state information of the subject vehicle, including offset information, heading information, and slalom information of the subject vehicle, may be received, and whether a driving state of the subject vehicle satisfies the short cut-in target identification entry condition may be determined based on the driving state information of the subject vehicle.

In this case, according to the present disclosure, whether the driving state of the subject vehicle satisfies at least one of an offset driving condition, a heading driving condition, or a slalom driving condition may be determined.

According to the present disclosure, in the case of the short cut-in target identification entry condition, the validity of ODM information may be verified (S20).

Here, according to the present disclosure, as the verification result of the validity of the ODM information, when the ODM information is not valid, invalid ODM information may be removed (S30).

For example, according to the present disclosure, the attributes of the ODM information may be determined to identify the ODM information from a stationary obstacle, and the identified ODM information may be determined to be invalid.

If necessary, according to the present disclosure, ODM information measured by the leading ego-vehicle lane target may be identified from ODM information, and identified ODM information may be identified to be invalid.

Then, according to the present disclosure, the ODM information may be corrected based on the driving state of the subject vehicle (S40).

Here, according to the present disclosure, the ODM information may be corrected based on at least one of the offset information or the heading information of the subject vehicle.

In this case, according to the present disclosure, ODM information including a grid map may be rearranged based on a coordinate system with respect to a driving lane.

Then, according to the present disclosure, an ODM track candidate group including a plurality of candidate tracks may be selected based on track information (S50).

Here, according to the present disclosure, tracks in left and right lanes based on a subject vehicle lane may be selected as an ODM track candidate group among a plurality of sensor fusion tracks based on track information.

According to the present disclosure, tracks present in a specific distance period based on a reference for measuring a longitudinal position of left and right lane targets may be selected as an ODM track candidate group.

According to the present disclosure, tracks in left and right lanes in a distance period closer to a longitudinal position than a position of the leading ego-vehicle lane target may be selected as an ODM track candidate group.

According to the present disclosure, each candidate track and an ODM object corresponding thereto may be matched to a grid map of ODM information to identify short cut-in of a candidate track (S60).

Here, according to the present disclosure, a margin value may be added to the length and width of each candidate track to set a candidate track matching region, and short cut-in of the candidate track may be identified based on the set candidate track matching region.

For example, according to the present disclosure, the length of the candidate track and the length margin may be summed to set a longitudinal region of the candidate track matching region, and the width of the candidate track and the width margin may be summed to set a lateral region of the candidate track matching region.

If necessary, according to the present disclosure, a width margin value for heading may be added to the width of each candidate track to set a candidate track matching region, and short cut-in of the candidate track may also be identified based on the set candidate track matching region.

According to the present disclosure, the short cut-in state of the candidate track may be determined to be any one of an undetected state, a new state, an update state, a track coasting state, an ODM coasting state, and a time coasting state, based on the matching.

Then, according to the present disclosure, a short cut-in target may be determined among the short cut-in candidate tracks (S70).

Here, according to the present disclosure, the candidate track closest to the subject vehicle may be identified as the short cut-in target among candidate tracks determined as short cut-in tracks in left and right lanes based on the subject vehicle lane.

For example, according to the present disclosure, a first candidate track that is closest to the subject vehicle may be selected among candidate tracks identified as short cut-in tracks in a left lane based on the subject vehicle lane, a second candidate track that is closest to the subject vehicle may be selected among candidate tracks identified as short cut-in tracks in a right lane based on the subject vehicle lane, and two candidate tracks including the first and second candidate tracks may be determined as the short cut-in target.

Then, according to the present disclosure, the determined short cut-in target information may be output (S80).

Here, according to the present disclosure, the position information and the relative speed information may be calculated based on a measurement point of the short cut-in target, and the short cut-in target information including the calculated position and relative speed information may be output.

According to the present disclosure, whether short cut-in target identification is terminated may be checked (S90), and when the short cut-in target identification is terminated, the short cut-in target identification procedure may be terminated.

According to the present disclosure, a computer-readable recording medium having recorded thereon a program for executing the identification method of a short cut-in target identification apparatus may perform procedures provided in a method of identifying a short cut-in target.

A vehicle according to an embodiment of the present disclosure may include a sensing apparatus configured to sense a subject vehicle and a surrounding object, and a short cut-in target identification apparatus configured to identify a short cut-in vehicle based on subject vehicle and surrounding object information received from the sensing apparatus, wherein the short cut-in target identification apparatus includes an ODM information calculator configured to calculate ODM information based on the subject vehicle and surrounding object information, a track information calculator configured to calculate track information based on the subject vehicle and surrounding object information, and a short cut-in target selector configured to determine whether the subject vehicle satisfies a short cut-in target identification entry condition, to verify the validity of the ODM information and to remove invalid ODM information when the subject vehicle satisfies the short cut-in target identification entry condition, to correct the ODM information based on a driving state of the subject vehicle, to select an ODM track candidate group including a plurality of candidate tracks based on the track information, to match each candidate track and an ODM object corresponding thereto to a grid map of the ODM information to identify short cut-in of the candidate track, to determine a short cut-in target from short cut-in candidate tracks, and to output the determined short cut-in target information.

As such, according to the present disclosure, the ODM information corrected based on the driving state of the subject vehicle and the plurality of candidate tracks selected based on the track information may be matched to each other to identify the short cut-in target vehicle, thereby enhancing reliability and safety.

Thus, according to the present disclosure, various situations of a counterpart vehicle that cuts in at a low speed from a short distance may be accurately determined, thereby enhancing reliability and safety.

In the short cut-in target identification apparatus and the identification method thereof related to at least one embodiment of the present disclosure as configured above, the ODM information corrected based on the driving state of the subject vehicle and the plurality of candidate tracks selected based on the track information may be matched to each other to identify the short cut-in target vehicle, thereby enhancing reliability and safety.

Thus, according to the present disclosure, various situations of a counterpart vehicle that cuts in at a low speed from a short distance may be accurately determined, thereby enhancing reliability and safety.

It will be appreciated by persons skilled in the art that that the effects that could be achieved with the present disclosure are not limited to what has been particularly described hereinabove and other advantages of the present disclosure will be more clearly understood from the detailed description.

The aforementioned present disclosure can also be embodied as computer readable code stored on a computer readable recording medium. The computer readable recording medium is any data storage device that can store data which can thereafter be read by a computer. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, carrier waves (e.g., transmission via the Internet), etc.

It will be apparent to those skilled in the art that various modifications and variations can be made in the present disclosure without departing from the spirit or scope of the embodiments. Thus, it is intended that the present disclosure cover the modifications and variations of the embodiment provided they come within the scope of the appended claims and their equivalents.

What is claimed is:

1. A short cut-in target identification apparatus comprising:
   an occupancy distance map (ODM) information calculator configured to calculate ODM information based on a subject vehicle and surrounding object information;
   a track information calculator configured to calculate track information based on the subject vehicle and the surrounding object information; and
   a short cut-in target selector configured to select a short cut-in target based on the ODM information and the track information, wherein the short cut-in target selector is configured to:
   determine whether the subject vehicle satisfies a short cut-in target identification entry condition;
   verify validity of the ODM information;
   remove invalid ODM information when the subject vehicle satisfies the short cut-in target identification entry condition;
   correct the ODM information based on a driving state of the subject vehicle;
   select an ODM track candidate group including a plurality of candidate tracks based on the track information;
   match each candidate track and an ODM object corresponding thereto to a grid map of the ODM information to identify short cut-in of the candidate track
   determine short cut-in target information from short cut-in candidate tracks; and
   output the determined short cut-in target information.

2. The short cut-in target identification apparatus of claim 1, wherein the short cut-in target selector is configured to receive driving state information of the subject vehicle when determining whether the subject vehicle satisfies the short cut-in target identification entry condition, the driving state information including offset information, heading information, and slalom information of the subject vehicle, the short cut-in target selector configured to determine whether the driving state of the subject vehicle satisfies the short cut-in target identification entry condition based on the driving state information of the subject vehicle.

3. The short cut-in target identification apparatus of claim 1, wherein, when verifying the validity of the ODM information, the short cut-in target selector is configured to determine attributes of the ODM information, identify ODM information from a stationary obstacle, and determine the identified ODM information to be invalid.

4. The short cut-in target identification apparatus of claim 1, wherein, when verifying the validity of the ODM information, the short cut-in target selector is configured to identify ODM information measured by a leading ego-vehicle lane target from the ODM information, and determine the identified ODM information to be invalid.

5. The short cut-in target identification apparatus of claim 1, wherein, when correcting the ODM information, the short cut-in target selector is configured to correct the ODM information based on offset information or heading information of the subject vehicle.

6. The short cut-in target identification apparatus of claim 1, wherein, when selecting the ODM track candidate group, the short cut-in target selector is configured to select tracks in left and right lanes based on a subject vehicle lane as an ODM track candidate group among a plurality of sensor fusion tracks based on the track information.

7. The short cut-in target identification apparatus of claim 1, wherein, when identifying short cut-in of the candidate track, the short cut-in target selector is configured to add a margin value to a length and width of each candidate track to set a candidate track matching region, and to identify short cut-in of the candidate track based on the set candidate track matching region.

8. The short cut-in target identification apparatus of claim 1, wherein, when identifying short cut-in of the candidate track, the short cut-in target selector is configured to add a width margin value for heading to a width of each candidate track to set a candidate track matching region, and to identify short cut-in of the candidate track based on the set candidate track matching region.

9. The short cut-in target identification apparatus of claim 1, wherein, when determining the short cut-in target information, the short cut-in target selector is configured to determine a candidate track closest to the subject vehicle as a short cut-in target among candidate tracks identified for short cut-in in left and right lanes based on a subject vehicle lane.

10. The short cut-in target identification apparatus of claim 1, wherein, when outputting the determined short cut-in target information, the short cut-in target selector is configured to calculate position information and relative speed information based on a measurement point of the short cut-in target, and to output short cut-in target information including the calculated position and relative speed information.

11. A method of identifying a short cut-in target based on ODM information and track information, the method comprising:
   determining whether a subject vehicle satisfies a short cut-in target identification entry condition;
   verifying validity of the ODM information and removing invalid ODM information when the subject vehicle satisfies the short cut-in target identification entry condition;
   correcting the ODM information based on a driving state of the subject vehicle;
   selecting an ODM track candidate group including a plurality of candidate tracks based on the track information;
   matching each candidate track and an ODM object corresponding thereto to a grid map of the ODM information to identify short cut-in of the candidate track;
   determining short cut-in target information from short cut-in candidate tracks; and
   outputting the determined short cut-in target information.

12. The method of claim 11, wherein determining whether the subject vehicle satisfies the short cut-in target identification entry condition comprises:
   receiving driving state information of the subject vehicle, the driving state information including offset information, heading information, and slalom information of the subject vehicle; and determining whether the driving state of the subject vehicle satisfies the short cut-in target identification entry condition based on the driving state information of the subject vehicle.

13. The method of claim 11, wherein identifying the validity of the ODM information comprises:
determining attributes of the ODM information;
identifying ODM information from a stationary obstacle; and
determining the identified ODM information to be invalid.

14. The method of claim 11, wherein identifying the validity of the ODM information comprises:
identifying ODM information measured by a leading ego-vehicle lane target from the ODM information; and
determining the identified ODM information to be invalid.

15. The method of claim ii, wherein correcting the ODM information comprises correcting the ODM information based on offset information or heading information of the subject vehicle.

16. The method of claim ii, wherein selecting the ODM track candidate group comprises selecting tracks in left and right lanes based on a subject vehicle lane as an ODM track candidate group among a plurality of sensor fusion tracks based on the track information.

17. The method of claim ii, wherein determining the short cut-in target information comprises determining a candidate track closest to the subject vehicle as a short cut-in target among candidate tracks identified for short cut-in in left and right lanes based on a subject vehicle lane.

18. The method of claim ii, wherein outputting the determined short cut-in target information comprises:
calculating position information and relative speed information based on a measurement point of the short cut-in target; and
outputting short cut-in target information including the calculated position and relative speed information.

19. A non-transitory computer-readable recording medium having recorded thereon a program for executing the method of claim ii.

20. A vehicle comprising:
a sensing apparatus configured to sense a subject vehicle and a surrounding object; and
a short cut-in target identification apparatus configured to identify a short cut-in vehicle based on subject vehicle and surrounding object information received from the sensing apparatus, wherein the short cut-in target identification apparatus comprises:
an occupancy distance map (ODM) information calculator configured to calculate ODM information based on the subject vehicle and surrounding object information;
a track information calculator configured to calculate track information based on the subject vehicle and surrounding object information; and
a short cut-in target selector configured to determine whether the subject vehicle satisfies a short cut-in target identification entry condition, to verify the validity of the ODM information and to remove invalid ODM information when the subject vehicle satisfies the short cut-in target identification entry condition, to correct the ODM information based on a driving state of the subject vehicle, to select an ODM track candidate group including a plurality of candidate tracks based on the track information, to match each candidate track and an ODM object corresponding thereto to a grid map of the ODM information to identify short cut-in of the candidate track, to identify short cut-in target information from short cut-in candidate tracks, and to output the identified short cut-in target information.

* * * * *

UNITED STATES PATENT AND TRADEMARK OFFICE
CERTIFICATE OF CORRECTION

PATENT NO. : 11,687,090 B2
APPLICATION NO. : 16/791007
DATED : June 27, 2023
INVENTOR(S) : Lee et al.

Page 1 of 1

It is certified that error appears in the above-identified patent and that said Letters Patent is hereby corrected as shown below:

In the Claims

In Column 25, in Claim 15, Line 18, delete "claim ii," and insert -- claim 11, --, therefor.

In Column 25, in Claim 16, Line 22, delete "claim ii," and insert -- claim 11, --, therefor.

In Column 25, in Claim 17, Line 27, delete "claim ii," and insert -- claim 11, --, therefor.

In Column 25, in Claim 18, Line 32, delete "claim ii," and insert -- claim 11, --, therefor.

In Column 26, in Claim 19, Line 5, delete "claim ii." and insert -- claim 11. --, therefor.

Signed and Sealed this
Twelfth Day of September, 2023

Katherine Kelly Vidal
*Director of the United States Patent and Trademark Office*